E. A. NELSON.
VALVE.
APPLICATION FILED FEB. 5, 1910.

1,040,738.

Patented Oct. 8, 1912.

Witnesses

Inventor
Emil A. Nelson
By Whittemore Hulbert + Whittemore
Attys

UNITED STATES PATENT OFFICE.

EMIL A. NELSON, OF DETROIT, MICHIGAN, ASSIGNOR TO ROTARY VALVE MOTOR COMPANY, OF DETROIT, MICHIGAN, A CORPORATION OF MICHIGAN.

VALVE.

1,040,738.       Specification of Letters Patent.        Patented Oct. 8, 1912.

Application filed February 5, 1910. Serial No. 542,191.

*To all whom it may concern:*

Be it known that I, EMIL A. NELSON, a citizen of the United States of America, residing at Detroit, in the county of Wayne and State of Michigan, have invented certain new and useful Improvements in Valves, of which the following is a specification, reference being had therein to the accompanying drawings.

The invention relates to valves more particularly designed for use in explosion engines, and it is the object of the invention to provide means for sealing and lubricating the valve without danger of feeding an excess of the lubricant into the valve case, thereby avoiding carbonization.

To this end, the invention consists in the construction as hereinafter set forth.

Figure 1:
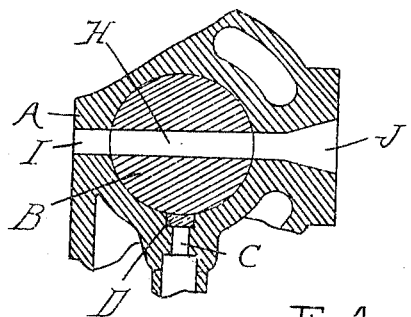
Figure 3:
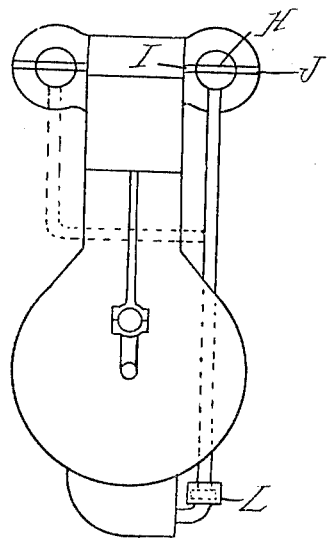
Figure 4:
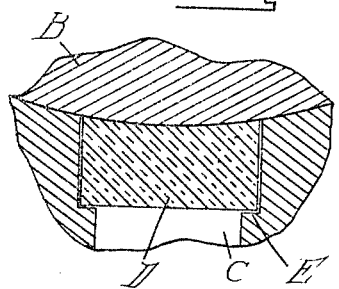
Figure 2:
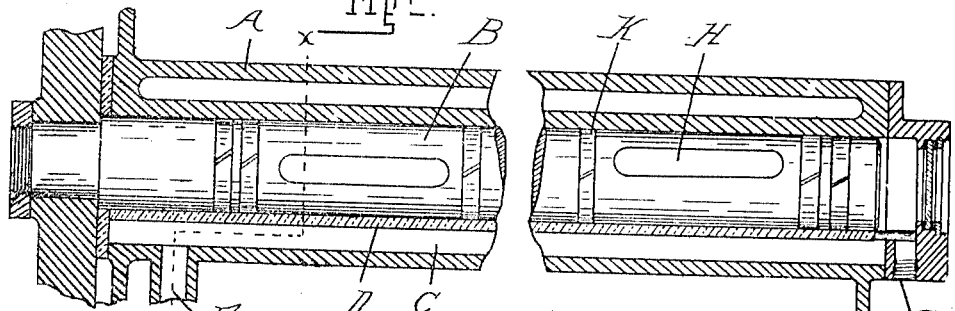
Figure 5:
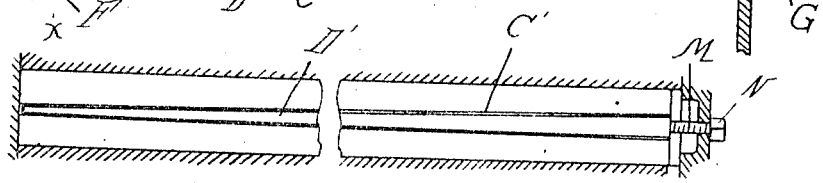

In the drawings, Figure 1 is a section through a portion of the casing of an explosion engine, to which my improved valve is applied; Fig. 2 is a longitudinal section through a portion of the valve; Fig. 3 is a diagrammatic section through an explosion engine provided with my improved construction of valve for both inlet and exhaust; Fig. 4 is a horizontal section through the valve case with the valve removed, showing a modified construction; and Fig. 5 is a sectional view of a modified construction.

My improved valve is preferably of the rotary type and, as shown, A is a cylindrical valve casing. B is a rotary valve therein which is accurately fitted to its seat with only sufficient clearance to provide freedom of movement.

C is a channel extending longitudinally of the valve case, so as to be transverse to the direction of the movement of the valve. This channel, as shown, is formed in the lower portion of the valve case A, and is preferably of sufficient area to provide free passage for a volume of the lubricant.

D is a segmental insert, which closes the opening of the channel C into the valve case. This insert is seated upon shoulders E, and is so fitted as to provide a slight clearance preferably only a few thousandths of an inch between said sides and the walls of the groove or channel.

The channel C extends the complete length of the case, and is connected at its opposite ends with conduits F and G, which preferably connect it with a circulatory lubricating system. Thus when the engine is in operation a stream of lubricant is constantly passed through the channel C which is preferably at a pressure higher than atmosphere.

With the construction described the lubricant in the channel C, which will be forced upward through the restricted passage between the insert and the walls of the channel, and a film of oil passes through this passage and into the space between the rotary valve B and its seat. This film is uniformly distributed over the entire length of the valve, and by its rotation is distributed around the seat, so as to maintain a fluid seal.

The valve B is provided with ports H, which register with coöperating ports I and J in the valve case. The port H, during the rotation of the valve, crosses the insert D and oil channel, but on account of the restricted width of the slit which forms the oil channel a flow of oil into the port is prevented. Thus the port is kept free from deposit of the lubricant, which avoids danger of carbonization.

My construction of valve may be applied to an explosion engine for both the inlet and exhaust valves, as shown in Fig. 3, and is also applicable to engines of the multi-cylinder type. For the latter construction, the rotary valve extends continuously to the several cylinders, and is provided with ports for coöperating with the individual ports of the cylinders. To prevent danger of leakage from one port to another, expansible rings K are arranged intermediate the cylinders preferably in grooves formed in the valve.

It is usual to lubricate the internal mechanism of engines of this type by a splash system, and to provide means for maintaining a constant level of the lubricant in the lower portion of the crank case. This constant level is maintained by a pump, which constantly discharges lubricant in the crank case, an overflow being provided for discharging the surplus lubricant.

With my construction a pump L is provided for elevating the lubricant, which is then passed through the conduits F, C and G before it is discharged into the crank case. Thus a constant supply of the lubricant under pressure is maintained at all times in the channel C.

In the construction shown in Fig. 5, the width of the slit or clearance space is adjustable, so as to vary the restriction. This is accomplished by making the insert D' of tapering or wedge-shape form fitting a correspondingly shaped channel C' in the valve seat. At one end of the insert is a threaded shank M which passes out from the case and is provided with an adjusting nut N. This construction permits of adjusting the insert D' longitudinally, and in so doing varying the width of the clearance space. Thus the clearance may be restricted until waste of oil is prevented without interfering with the successful operation of the valve.

What I claim as my invention is:

1. In an explosion engine, the combination with a valve and a valve seat, of a channel extending transverse to the movement of said valve on its seat, and a slit extending from said channel to the contacting faces of said valve and seat, said slit being restricted in width for the passage of a liquid film therethrough.

2. In an explosion engine, the combination with a rotary valve and a seat therefor, of a channel extending transverse to the movement of said valve across said seat, and a slit connecting said channel with the contacting faces of said valve and seat, said slit being restricted in width for the passage of a liquid film therethrough.

3. In an explosion engine, the combination with a rotary valve and a valve seat therefor, of a groove or channel formed in the one extending transverse to the movement of the valve, and a segmental insert in the mouth of said channel having a restricted clearance for the passage of a liquid film.

4. In an explosion engine, the combination with a rotary cylindrical valve and a cylindrical seat therefor, of a channel extending longitudinally of one of said members, and a segmental insert in the mouth of said channel having a restricted clearance for the passage of a liquid film.

5. In an explosion engine, the combination with a cylindrical valve, of a cylindrical valve seat therefor formed with a slight clearance therebetween, of a groove or channel formed longitudinally of said valve seat, a segmental insert in the mouth of said channel having a restricted clearance for the passage of a liquid film, and means for maintaining liquid in said channel beneath said insert.

6. In an explosion engine, the combination with a valve and a valve seat, of a channel extending parallel to the contacting faces of said valve and seat and a slit restricted in width for the passage of a liquid film connecting said channel with the space between the valve and its seat.

7. In an explosion engine, the combination with a valve and its seat, of a channel extending parallel through the contacting faces of said valve and seat, a slit connecting said channel with the face of said seat, and means for adjusting the width of said slit, for the purpose described.

8. In an explosion engine, the combination with a valve and its seat, of a channel extending parallel to the contacting faces of said valve and seat and tapering from one end toward the other, and a correspondingly tapered insert in said channel forming a restricted clearance space for the passage of the liquid film from said channel to said seat.

9. In an explosion engine, the combination with a valve and its seat, of a channel extending parallel to the contacting faces of said valve and seat and tapering from one end toward the other, a correspondingly tapered insert in said channel, and means operable from outside the case for adjusting said insert to vary the width of the clearance space between the same and the channel.

In testimony whereof I affix my signature in presence of two witnesses.

EMIL A. NELSON.

Witnesses:
NELLIE KINSELLA,
W. J. BELKNAP.